United States Patent
Paez

[11] Patent Number: 5,372,336
[45] Date of Patent: Dec. 13, 1994

[54] FOLDING WING ASSEMBLY

[75] Inventor: Carlos A. Paez, Northport, N.Y.

[73] Assignee: Grumman Aerospace Corporation, Bethpage, N.Y.

[21] Appl. No.: 42,634

[22] Filed: Apr. 5, 1993

[51] Int. Cl.[5] .............................................. B64C 3/56
[52] U.S. Cl. ..................................... 244/49; 244/130
[58] Field of Search ............... 244/49, 213, 130, 215, 244/3.27, 3.28, 3.29

[56] References Cited

U.S. PATENT DOCUMENTS

| | | | |
|---|---|---|---|
| 2,712,421 | 7/1955 | Naumann | 244/49 |
| 3,039,721 | 6/1962 | Rogers, Jr. | 244/135 R |
| 3,063,660 | 11/1962 | Jarrell | 244/49 |
| 3,081,053 | 3/1963 | Jarrell | 244/49 |
| 4,691,880 | 9/1987 | Frank | 244/49 |
| 4,717,093 | 1/1988 | Rosenberger et al. | 244/49 |
| 4,888,451 | 12/1989 | Toni et al. | 174/94 R |

FOREIGN PATENT DOCUMENTS 635261 4/1950 United Kingdom ............... 244/49

*Primary Examiner*—Michael S. Huppert
*Assistant Examiner*—Anne E. Bidwell
*Attorney, Agent, or Firm*—Bacon & Thomas

[57] ABSTRACT

A folding wing assembly for use on an aircraft is disclosed. The folding wing assembly includes inboard and outboard wing sections which are pivotally interconnected such that the outboard wing section may pivot between folded and unfolded positions. A fairing unit is further pivotally interconnected to both the wing sections and extends chordwise across the wing assembly. The fairing unit is provided with a seal extending chordwise across an inner spanwise end of the fairing. The seat is adapted to engage the underside of a sealing flange attached to the upper surface of the inboard wing section. The other spanwise end of the fairing is adapted to engage a seal carried by the outboard wing section when the outboard wing section is in its fully unfolded position. In this unfolded position, the sealing flange and the fairing unit are substantially flush with the upper surface of the inboard and outboard wing sections and function to cover and seal the joint area between the wing sections so as to minimize aerodynamic drag resulting from the joint.

21 Claims, 4 Drawing Sheets

FOLDING WING ASSEMBLY

BACKGROUND OF THE INVENTION

1. Field of the Invention

The present invention pertains to the art of aircraft and, more particularly, a folding wing assembly for an aircraft.

2. Description of the Prior Art

Folding wing assemblies for use on aircraft are known in the art as evidenced by U.S. Pat. Nos. 2,712,421, 3,039,721, 3,063,660, 3,081,053 and 4,717,093. In each of these prior art arrangements, a spanwise outboard wing section is pivotally attached to a spanwise inboard wing section for vertical pivotal movement about a longitudinal axis so as to be movable between folded and unfolded positions. A major problem associated with folding wing assemblies is to interconnect the inboard and outboard wing sections in such a manner as to maintain structural rigidity of the entire wing assembly while minimizing any aerodynamic drag created by the joint between the two wing sections. In order to assure structural rigidity, it is necessary to directly pivotally interconnect the interior structural supports of the wing sections instead of merely interconnecting the sections along their top surfaces, as described in the '721 patent mentioned above. In addition, in order to minimize aerodynamic drag, it is necessary that the surface above the joint area be flush with the upper surface of the wing sections when the wing assembly is in its unfolded position. In addition, it is necessary to assure that the joint area is sealed to prevent the passing air from entering this joint area and creating turbulence and increasing aerodynamic drag. The known prior art fails to achieve these important functions and therefore there is a need in the prior art for a folding wing assembly which is simple in construction yet structurally sound and which minimizes aerodynamic drag that can develop at the joint area between the inboard and outboard wing sections.

SUMMARY OF THE INVENTION

It is an object of the present invention to provide an improved folding wing assembly which is relatively simple in construction yet structurally sound.

It is another object of the present invention to provide a folding wing assembly for an aircraft which minimizes the aerodynamic drag that can be associated with the joint area between an inboard and outboard wing sections of a folding wing assembly.

These and other objects of the present invention are accomplished by providing a folding wing assembly for an aircraft comprising an inboard wing section having an inner spanwise end adapted to be fixedly secured to a fuselage of an aircraft and an outer spanwise end which is pivotally interconnected to a spanwise inboard end of an outboard wing section. The pivotal interconnection is comprised of various, chordwise spaced pivotally interconnected brackets which are fixedly secured to the inboard and outboard wing sections respectively. Further pivotally connected to both the inboard and outboard wing sections, above the pivot brackets, is a fairing unit. The fairing unit is pivotally connected, adjacent one end thereof, to the inboard wing section by means of a plurality of chordwise spaced, gooseneck type hinges. The fairing unit is further pivotally interconnected to the outboard wing section by a plurality of links such that pivoting of the outboard wing section with respect to the inboard wing section automatically causes pivoting of the fairing unit.

The upper surface of the spanwise outer end of the inboard wing section and the inner spanwise end of the outboard wing section are provided with chordwise extending notched areas. The notched area in the inboard wing section has fixedly thereto a sealing flange which includes an inner end mounted in the notched area such that the upper surface of the sealing flange is flush with the upper surface of the inboard wing section. The sealing flange further includes a cantilevered outer end that extends above the joint area between the inboard and outboard wing sections. The notched area provided at the inner spanwise end of the outboard wing section has secured therein a first seal member. A second, chordwise extending seal member is fixedly secured to the upper innermost end of the fairing unit.

By this arrangement, when the outboard wing section is pivoted relative to the inboard wing section from a folded position to an unfolded or extended position, the fairing unit will automatically pivot downwardly. When the outboard wing section reaches its fully unfolded position, the second seal member carried by the fairing unit will engage the underside of the cantilevered outer end of the sealing flange and the outer spanwise end of the fairing unit will seal against the first seal member carried by the outboard wing section. In addition, the sealing flange in conjunction with the fairing unit will extend chordwise across the entire joint area between the inboard and outboard wing sections such that the upper surface of the entire wing will be substantially flush. Mounting of the sealing flange and the fairing unit flush with the upper surface of the inboard and outboard wing sections and utilizing the seals, in combination with the pivot brackets between the inboard and outboard wing sections, provides an aerodynamic and structurally sound folding wing assembly.

Other objects, features and advantages of the present invention shall become apparent from the following detailed description of a preferred embodiment thereof, when taken in conjunction with the drawings wherein like reference characters refer to corresponding parts in the several views.

DETAILED DESCRIPTION OF THE PREFERRED EMBODIMENT

Figure 1:
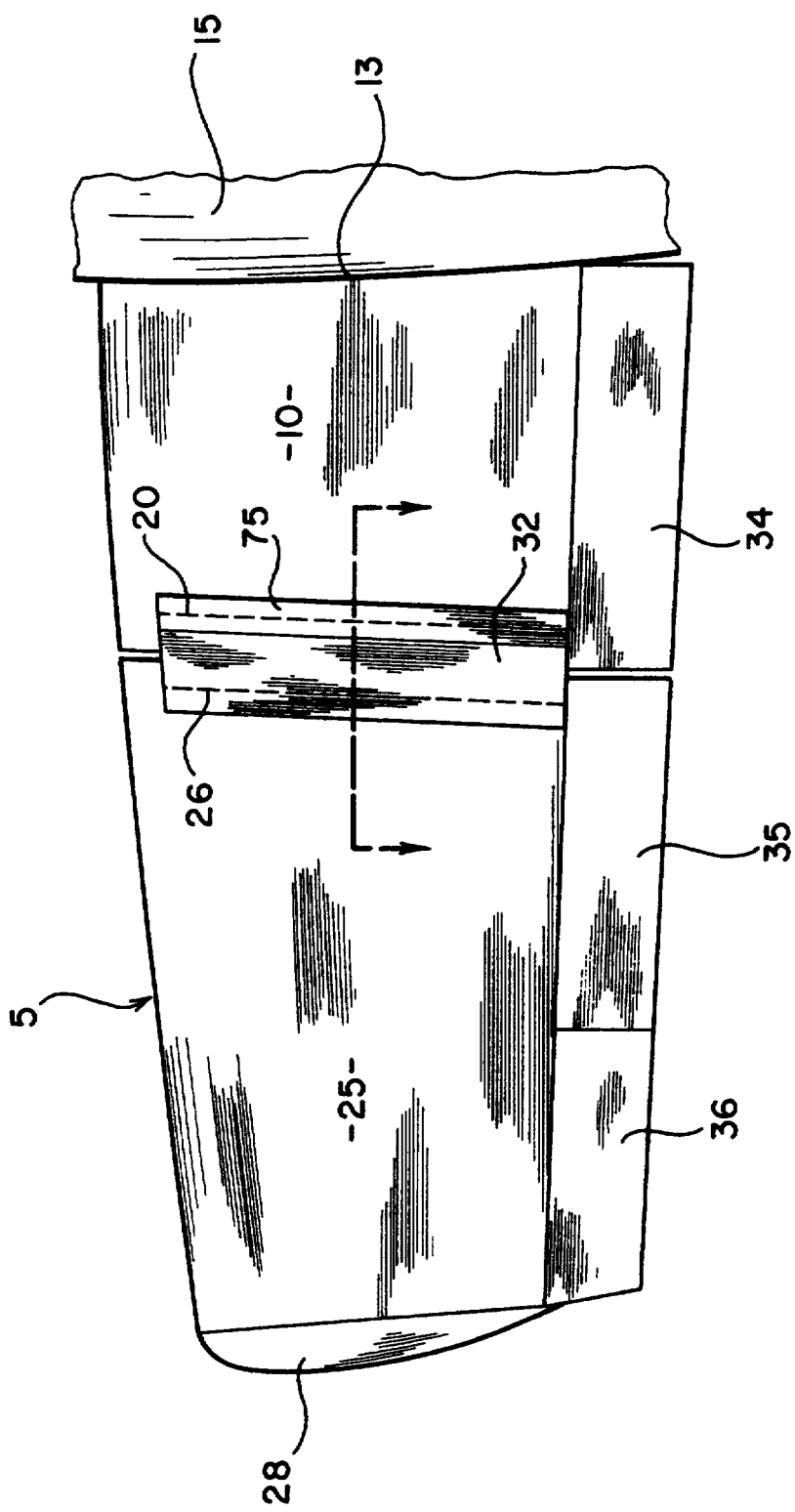
FIG. 1 is a top view of a folding wing assembly for use on an aircraft according to a preferred embodiment of the invention.

A folding wing assembly 5, according to the preferred embodiment of the invention, shall now be described with initial reference to FIG. 1. Folding wing assembly 5 includes an inboard wing section 10 having an inner spanwise end 13 fixedly secured by any means known in the art to a fuselage 15 of an aircraft. Inboard wing section 10 further includes an outer spanwise end 20.

Folding wing assembly 5 further includes an outboard wing section 25 having an inner spanwise end 26 and an outer spanwise end 28. As will be more fully discussed hereinafter, inner spanwise end 26 of outboard wing section 25 is pivotally attached to outer spanwise end 20 of inboard wing section 10 such that outboard wing section 25 can be pivoted relative to inboard wing section 10 between folded and unfolded positions. Folding wing assembly 5 further includes a fairing unit 32 which covers the pivoting joint between inboard and outboard wing sections 10, 25 as will also be more fully discussed below. Finally, as shown in FIG. 1, folding wing assembly 5 includes a pair of flaps 24 and 35 along with an aileron 36. As is widely known in the art, flaps 34, 35 and ailerons 36 are pivotally attached to folding wing assembly 5 at spaced, spanwise intervals and are used to control wing lift characteristics.

Figure 2:
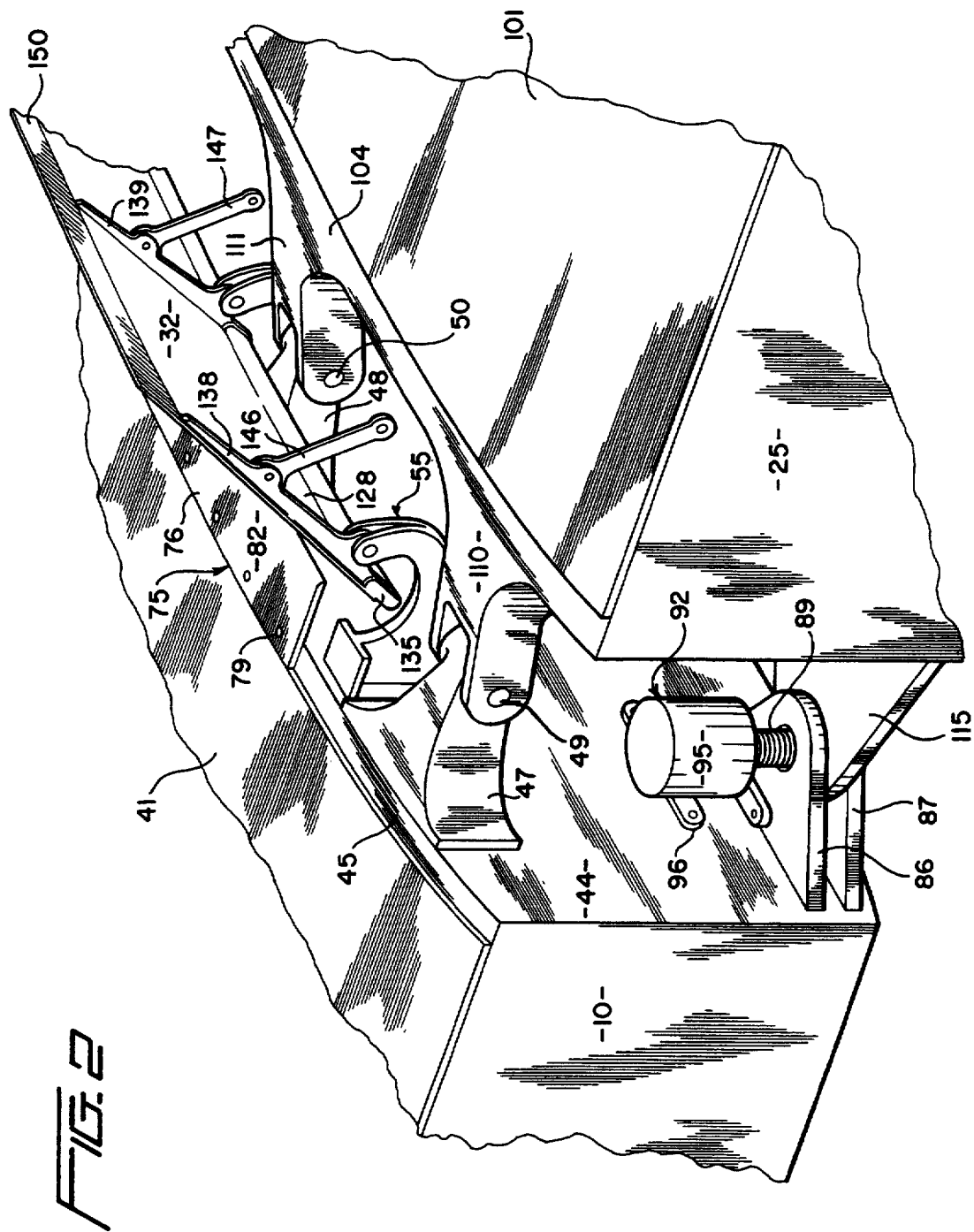
FIG. 2 is a partial perspective view of the interconnection between the inboard and outboard wing sections of the folding wing assembly of the present invention with the wing sections shown in their unfolded condition and the fairing unit shown in a partially raised position.

The specifics of folding wing assembly 5 will now be more fully described with reference to FIGS. 2-4. As best shown in FIG. 2, inboard wing section 10 includes an upper skin section 41 which defines the top surface of inboard wing section 10, and an outer end wall 44 extending chordwise across inboard wing section 10. Extending chordwise across the top surface of inner wing section 10, between upper skin section 41 and end wall 44, is a stepped down area 45. The purpose of the stepped down area 45 will become more fully evident hereinafter. Fixedly secured to end wall 44 of inboard wing section 10 is a pair of chordwise spaced pivot fittings 47 and 48 which define and locate aligned, chordwise extending bushing and bolt assemblies 49 and 50 spaced from end wall 44. The particular number of pivot fittings 47, 48 incorporated in the folding wing assembly 5 of the present invention may be varied without departing from the invention. In general, the number of pivot brackets will be increased proportionally to the sizes of the wings, the wing loading and the aircraft usage.

Figure 4:
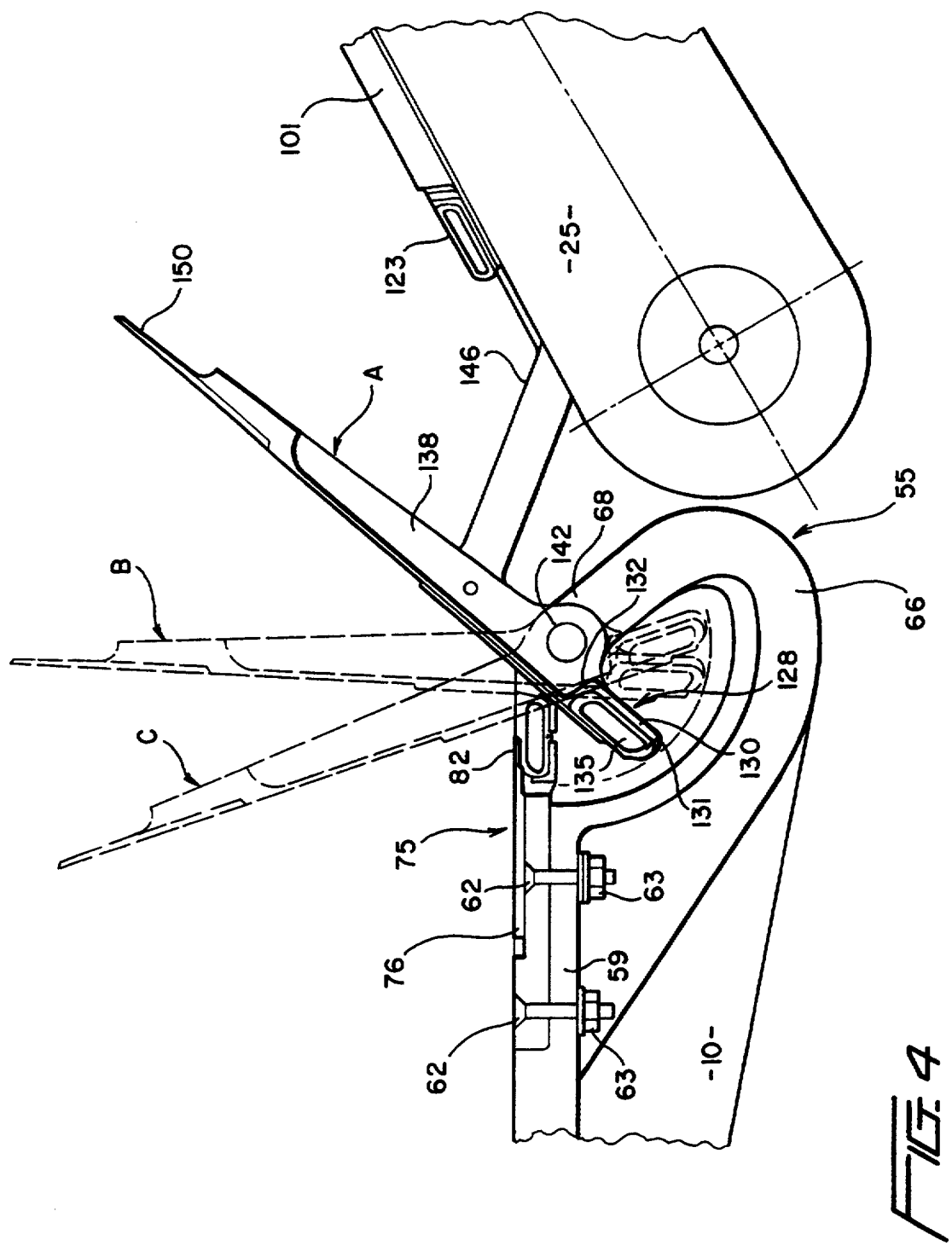
FIG. 4 is an enlarged side view depicting the interengagement between the fairing unit and each of the inboard and outboard wing sections.

As best shown in FIGS. 2 and 4, a pair of chordwise spaced gooseneck hinges 55 are also fixedly secured to inboard wing section 10. More specifically, each gooseneck hinge 55 includes a base portion 59 which is secured to upper skin section 41 by a plurality of flat head bolts 62 and corresponding nuts 63. In addition to base portion 59, each gooseneck hinge 55 includes a generally U-shaped body portion 66 which terminates at an end portion 68. End portion 68 includes a chordwise extending through hole (not labeled) as will be discussed more fully below.

Also fixedly secured to inboard wing section 10 is a sealing flange 75. Sealing flange 75 includes an inner mounting end 76 having a plurality of spaced holes 79. Holes 79 are adapted to receive the flat head bolts 62 used to secure the gooseneck hinges 55. More particularly, inner mounting end 76 of sealing flange 75 is located within notched area 45 so as to be substantially flush with the upper surface of inboard wing skin section 41 and secured in notched area 45 by receiving the outermost span-wise flat head bolts 62 used to secure the gooseneck hinges 55 to inboard wing section 10. In the preferred embodiment, four bolts are used to secure each gooseneck hinge 55 to inboard wing section 10 and the outermost two bolts 62 for each gooseneck hinge 55 is also adapted to be used for securing sealing flange 75.

As inner mounting end 76 of sealing flange 75 includes numerous apertures 79, additional fasteners (not shown) are further utilized to fixedly attach sealing flange 75 within notched area 45. Sealing flange 75 further includes a cantilevered outer end 82 which projects beyond end wall 44 of inboard wing section 10.

Located towards the bottom of end wall 44 of inboard wing section 10 is a pair of upper and lower spaced, parallel plates 86 and 87. Plates 86 and 87 include a vertically extending and aligned through hole 89. As best shown in FIGS. 2 and 3, a locking unit 92 including a cylindrical housing 95 is fixedly secured to end wall 44 by any mechanical means known in the art such as fasteners (not shown) that extend through a respective one of a plurality of lugs 96. In the preferred embodiment, locking unit 92 includes a solenoid controlled, retractable locking pin 98 which can either be in an extended position, as depicted in FIG. 3, wherein locking pin 98 extends substantially entirely through the vertically extending and aligned through hole 89 provided in upper and lower parallel plates 86, 87 and a retracted position (not shown) wherein locking pin 98 is fully housed in cylinder housing 98 or merely extends out of cylinder housing 95 a distance less than the thickness of upper parallel plate 86.

Referring back to FIG. 2, outboard wing section 25 includes an outer skin panel 101 which terminates, in the spanwise direction, short of an inboard end wall (not labeled) so as to define a down stepped area 104. The stepped area 104 extends chordwise substantially the entire chordwise width of outboard wing section 25. Fixedly secured to or integrally formed with outboard wing section 25 is a plurality of chordwise spaced, bifurcated lugs 110 and 111. Bifurcated or double shear lugs 110 and 111 are adapted to be pivotally mounted to pivot fittings 47 and 48 respectively by means of bushing and bold assemblies 49 and 50 respectively. With this interconnection of bifurcated lugs 110 and 111 with pivot fittings 47 and 48, outboard wing section 25 may pivot relative to inboard wing section 10 between an unfolded position as generally shown in FIGS. 1, 2 and 3 to a folded condition (a partially folded condition being shown in FIG. 4).

Figure 3:
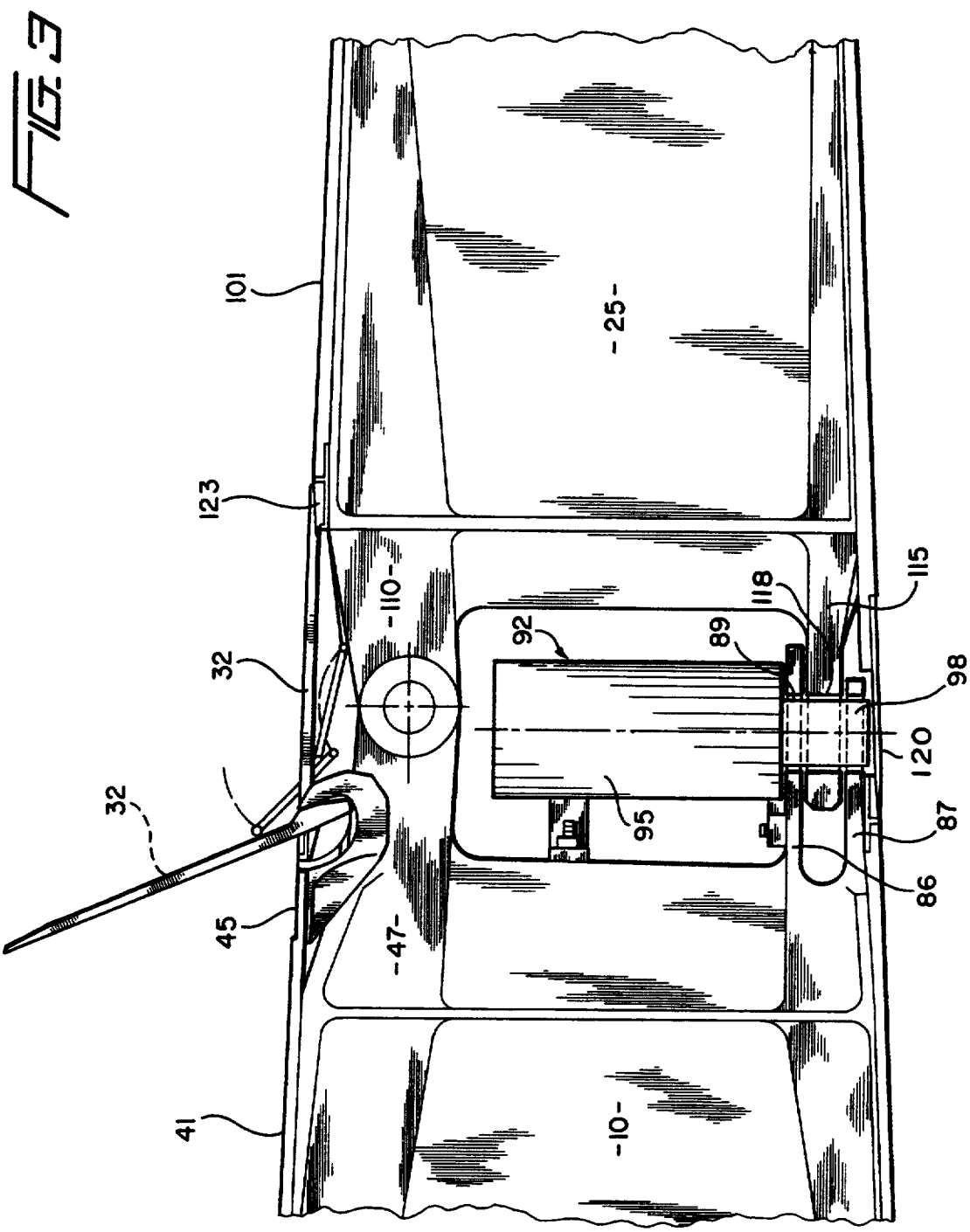
FIG. 3 is a cross-sectional view taken along line 3—3 in FIG. 1.

Outboard wing section 25 further has fixedly secured thereto or integrally formed therewith a locking plate 115, as best shown in FIGS. 2 and 3, which includes a through hole 118. Locking plate 115 is adapted to extend between upper and lower parallel plates 86, 87 such that when outboard wing section 25 is in its fully unfolded position, through hole 118 is aligned with through hole 89 and can receive locking pin 98 so as to prevent pivoting of outboard wing section 25 with respect to inboard wing section 10. Outboard wing section 25 further includes a transferse cover member 120 secured to a bottom portion thereof which is seated substantially flush with the bottom of inner wing section 10 when the wing assembly is fully unfolded as shown in FIG. 3. Although only one locking arrangement has been described. It should be recognized that plural locking units may be utilized and further the specific type of locking unit may be varied without departing from the function of the unit which is merely to provide a means to prevent pivoting of the outboard wing section 25 relative to the inboard wing section 10 when desired. Finally, as best shown in FIGS. 3 and 4, fixedly secured in stepped area 104 of outboard wing section 25 is a seal member 123. The construction and function of seal member 123 will be more fully described below.

A detailed description of fairing unit 32 will now be given. As best shown in FIG. 4, fairing unit 32 includes a first span-wise end 128 that is defined by a base 130 having inner and outer upstanding walls 131 and 132 that extend chordwise across fairing unit 32 so as to define a groove which is adapted to receive a seal member 135. In the preferred embodiment, seal member 135 is constructed in the same manner and with the same material as seal member 123 as referred to below. Fairing unit 32 further includes a plurality of laterally or chordwise spaced reinforcement and pivot support rails 138, 139 (also see FIG. 2) which extend spanwise below the top surface of fairing 32. Reinforcement and pivot support rails 138 and 139 are pivotally attached by means of pivot pins 142, adjacent first end 128, to an end portion 68 of a respective gooseneck hinge 55, Further pivotally mounted to reinforcement and pivot support rails 138 and 139, intermediate their length, are link members 146 and 147. The other ends of link members 146 and 147, remote from fairing unit 32, are adapted to be pivotally mounted to brackets (not shown) fixedly secured to the spanwise end wall (not labeled) of outboard wing section 25. Fairing unit 32 terminates in a second, reduced thickness and chordwise extending end 150. The reduction in the thickness of end 150 is best shown in FIG. 4, the length of which is equal to the spanwise distance of stepped area 104.

By this construction, fairing unit 32 is pivotally interconnected to both inboard wing section 10 and outboard wing section 25 and automatically pivots about gooseneck hinges 55 in response to pivoting of outboard wing section 25 with respect to inboard wing section 10. This feature is perhaps best shown in FIG. 4 wherein, when outboard wing section 25 has been pivoted to the position shown, fairing 32 is automatically pivoted to position A through link members 146 and 147. While FIG. 2 shows link members 146 and 147 to be fixed in length, in practice these would be adjustable in length to account for fabrication tolerances. Therefore, a turn buckle or other type of adjustment mechanism would be used. As outboard wing section 25 is further pivoted, fairing unit 32 can be further pivoted to intermediate position B and then to its fully pivoted position indicated at C. (At this point, it should be noted that link members 146 and 147 of fairing unit 32 are not connected to outboard wing section 25 in FIG. 2 and therefore fairing unit 32 can be shown in a raised position while outboard wing section 25 is unfolded in this Figure). During pivoting of fairing unit 32, the U-shaped body portion 66 of gooseneck hinges 55 accommodates the first end 128 of fairing unit 32.

When outboard wing section 25 is fully unfolded and locking pin 98 is extended through aligned apertures 89 and 118 as best shown in FIG. 3, the upper surface of fairing unit 32 is substantially flush with the upper surface of top skin section 41 of inboard wing section 10 and top skin section 101 of outboard wing section 25. More specifically, first end 128 of fairing unit 32 extends below cantilevered outer end 82 of sealing flange 75 such that seal member 135 engages the underside of cantilevered outer end 82 and second end 150 of fairing unit 32 presses against seal member 123 on outboard wing section 25. Therefore, by this construction, when outer wing section 25 is in its fully unfolded position, fairing unit 32 is fully towered and, in conjunction with sealing flange 75, provides a substantially flush upper surface for folding wing assembly 5. In use, fairing 32 and seating flange 75 will therefore minimize any aerodynamic drag associated with the joint area between the inboard and outboard wing sections 10, 25. At this point it should be noted that the size of the pivot fittings 47, 48 and gooseneck hinges 55 have been greatly exaggerated in FIGS. 2 and 4. In this sense, FIG. 3 should be referred to in order that the reader may better visualize the actual relative sizes of these members.

In the preferred embodiment, seal members 123 and 135 are formed of silicone rubber core with a stainless steel external mesh, for example, a mesh of approximately 25 strands per inch. Fairing unit 32 is preferably formed of graphite epoxy or metal, pivot fittings 47 and 48 and bifurcated lugs 110 and 111 are preferably formed from either aluminum or steel and the gooseneck hinges 55 are preferably formed from aluminum. Sealing flange 75 is preferably formed from metal so as to function as an additional electrical conductor between outboard wing section 25 and inboard wing section 10. If fairing unit 32 is formed from a composite structure, a conductive layer may be applied thereon so that the joint will have electrical continuity to conduct static and other electrical charges between the wing sections during operation. In this regard, it is further possible to match the impedance of the structure surrounding fairing unit 32 with the fairing unit so as to ensure proper electrical characteristics.

Although described with respect to a preferred embodiment of the invention, it should be understood that various changes and/or modifications can be made to the particular structure described without departing from the spirit of the invention. For instance, multiple fairing units 32 can be provided if the folding wing assembly of the present invention is utilized on larger aircrafts. In general, the invention is only intended to be limited by the scope of the following claims.

I claim:

1. A folding wing assembly for an aircraft comprising:

an inboard wing section having an inner spanwise end adapted to be fixedly secured to a fuselage of an airplane and an outer spanwise end;

an outboard wing section having inner and outer spanwise ends;

means for pivotally interconnecting the inner spanwise end of said outer wing section to the outer spanwise end of said inboard wing section such that said outboard wing section can be repeatedly pivoted between an unfolded position in which said outboard wing section forms a spanwise extension of said inboard wing section and a folded position;

a fairing unit extending chordwise across said wing assembly between said inboard and outboard wing sections so as to extend across said pivotal interconnecting means;

means for pivotally attaching said fairing unit to at least one of said inboard and outboard wing sections such that said fairing unit can be pivoted from a lowered position covering said pivotal interconnecting means when said outboard wing section is in an unfolded position to a raised position when said outboard wing section is in a folded position; and means for sealing said fairing unit against said inboard and outboard wing sections when said fairing unit is in its lowered position, said sealing means providing electrical continuity between said inboard and outboard wing sections while minimizing any aerodynamic drag associated with the presence of said fairing unit.

2. A folding wing assembly as claimed in claim 1, wherein said sealing means comprises first and second, chordwise extending seals positioned between said fairing unit and said inboard and outboard wing sections respectively.

3. A folding wing assembly as claimed in claim 2, wherein said fairing unit includes inner and outer spanwise ends, said first seal being attached to the inner end of said fairing unit.

4. A folding wing assembly as claimed in claim 3, further including a chordwise extending flange member fixedly secured to the outer spanwise end of said inboard wing section, said flange member including a cantilevered portion extending spanwise beyond the outer spanwise end of said inboard wing section, said cantilevered portion including a lower surface, said first seal engaging the lower surface of said cantilevered portion when said fairing unit is in its lowered position.

5. A folding wing assembly as claimed in claim 4, wherein said second seal is fixedly secured chordwise across said outboard wing section, said fairing unit having an outer spanwise edge which sealingly engages said second seal when said fairing unit is in its lowered position.

6. A folding wing assembly as claimed in claim 5, wherein said first and second seals comprise a stainless steel core embedded in silicone.

7. A folding wing assembly as claimed in claim 6, wherein said flange member is formed of an electrically conductive material.

8. A folding wing assembly as claimed in claim 1, wherein said pivotal attaching means includes at least one gooseneck hinge, fixedly secured to one of said inboard and outboard wing sections, to which said fairing unit is pivotally attached.

9. A folding wing assembly as claimed in claim 8, wherein said at least one gooseneck hinge is secured to said inboard wing section.

10. A folding wing assembly as claimed in claim 9, wherein said fairing unit includes inner and outer, chordwise extending edges, said fairing unit being pivotally connected to said at least one gooseneck hinge between the inner and outer edges of said fairing unit.

11. A folding wing assembly as claimed in claim 10, wherein said pivotal attaching means comprises a pair of gooseneck hinges spaced chordwise across said inboard wing section.

12. A folding wing assembly as claimed in claim 8, further including linkage means pivotally connecting said fairing unit to at least one of said inboard and outboard wing sections.

13. A folding wing assembly as claimed in claim 12, wherein said fairing unit includes inner and outer chordwise extending edges, said linkage means being pivotally attached to said fairing unit between said inner and outer edges.

14. A folding wing assembly as claimed in claim 13, wherein said linkage means comprises a pair of spaced linkage elements.

15. A folding wing assembly as claimed in claim 14, wherein said at least one gooseneck hinge is secured to said inboard wing section and said pair of spaced linkage elements pivotally interconnects said fairing unit to said outboard wing section.

16. A folding wing assembly as claimed in claim 15, wherein said fairing unit includes inner and outer, chordwise extending edges, said fairing unit being pivotally connected to said at least one gooseneck hinge between the inner and outer edges of said fairing unit.

17. A folding wing assembly as claimed in claim 16, wherein said pivotal attaching means comprises a pair of gooseneck hinges spaced chordwise across said inboard wing section.

18. A folding wing assembly as claimed in claim 17, wherein said sealing means comprises first and second, chord wise extending seals positioned between said fairing unit and said inboard and outboard wing sections, respectively.

19. A folding wing assembly as claimed in claim 18, further including a chordwise extending flange member fixedly secured to the outer spanwise end of said inboard wing section, said flange member including a cantilevered portion extending spanwise beyond the outer spanwise end of said inboard wing section, said cantilevered portion including a lower surface, said first seal being carried by the inner end of said fairing unit and engaging the lower surface of said cantilevered portion when said fairing unit is in its lowered position.

20. A folding wing assembly as claimed in claim 19, wherein said second seal is fixedly secured chordwise across said outboard wing section, said fairing unit having an outer spanwise edge which sealing engages said second seal when said fairing unit is in its lowered position.

21. A folding wing assembly as claimed in claim 1, further comprising locking means for selectively preventing said outboard wing section from pivoting relative to said inboard wing section through said pivotal interconnecting means.

* * * * *